March 24, 1936.    G. W. EMRICK    2,035,224
TAPPING ATTACHMENT
Filed July 12, 1935
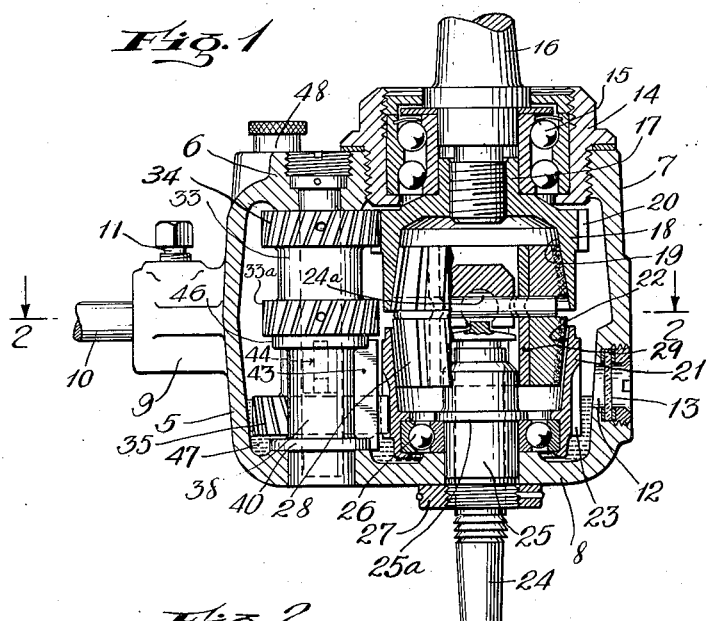
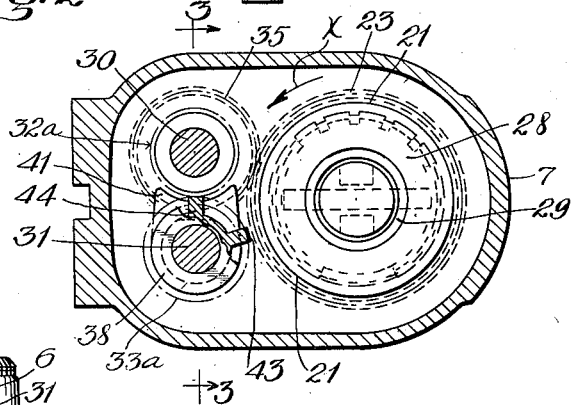
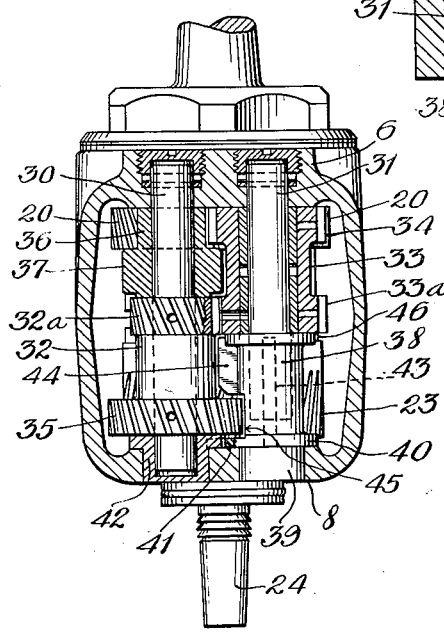
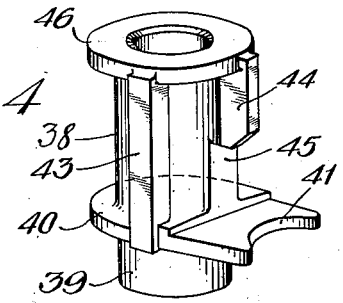
INVENTOR
GEORGE W. EMRICK
BY
ATTORNEY Patented Mar. 24, 1936

2,035,224

UNITED STATES PATENT OFFICE 2,035,224

TAPPING ATTACHMENT

George W. Emrick, Brooklyn, N. Y.

Application July 12, 1935, Serial No. 31,019

16 Claims. (Cl. 184—11)

This invention relates to tapping attachments and particularly to the provision of means in a device of this class for controlling and regulating the transmission of lubricating oil from the lower portion of the case or oil reservoir upwardly to the several operating parts of the attachment to provide constant lubrication thereof; a further object being to provide a means for controlling the transmission of lubrication in the form of baffles disposed adjacent and intermediate certain rotatable parts of the attachment to provide a distinct upward flow or fountain-like transmission of the lubricating oil within the casing of the device and to definitely direct the oil to predetermined working parts of the attachment; and with these and other objects in view, the invention consists in a device of the class and for the purpose specified which will provide a smooth, constant, non-sticking, non-chattering as well as sensitive friction clutch which will render long durable service especially in operating under high speeds as more fully hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through a tapping attachment made according to my invention.

Fig. 2 is a partial section on the line 2—2 of Fig. 1.

Fig. 3 is a section on the line 3—3 of Fig. 2; and

Fig. 4 is a perspective view of one form of baffling device which I employ.

The tapping attachment forming the subject matter of my present invention constitutes an improvement on the disclosure of a prior application Serial Number 726,107, filed May 17, 1934 issued in Patent No. 2,012,340, the present attachment differing only in so far as certain specific structural details are concerned in addition to the added baffles for controlling and regulating lubrication flow, distinguishing also in this respect from the wick feed illustrated in said earlier application.

In the present drawing, 5 represents a casing which is substantially cup-shaped in form including a top wall 6, side walls 7 and a bottom wall 8. The casing is provided with an extension 9 at one side thereof in which a stop rod 10 of the usual type is secured by means of a screw 11. One side wall of the casing is provided with a sight opening 12 arranged at a point above the bottom wall of the casing. A transparent panel 13 is supported in the opening 12 in any desired manner to effect a seal and also to provide a clear vision into the interior of the casing in order to examine and determine the level of oil therein which is preferably maintained at a point centrally of the opening 12. The top wall of the casing has a large opening in which is detachably mounted a cover or closure 14 in which is supported a doubled race ball bearing 15 in which the tapered shank or spindle 16 is mounted, said spindle being coupled with the upper sleeve end 17 of a clutch driving shell or sleeve 18.

The bore of the sleeve 18 is beveled as seen at 19 and the periphery of the sleeve adjacent the upper end thereof has a gear face 20. The sleeve 18 constitutes a forward drive clutch sleeve and at 21, I have shown a reverse drive clutch sleeve, the bore of which is tapered as seen at 22, the sleeve having a gear surface 23. In the forward drive of the device, the sleeve 21 is free to rotate on the driven spindle 24 or a bushing 25 in which the spindle 24 is arranged. A ball bearing 26 is provided for free rotation of the sleeve 21 upon said bushing. The bushing 25 is sealed in the casing 5 and extends well up into the casing to a point above the normal level of oil maintained in the casing, said bushing having a flange portion 25a which is drawn firmly against the inner race of the ball bearing 26 above the nut 27 which seats upon the bottom wall 8 of the casing.

The spindle 24 has at its upper end a universal joint attachment 24a of the type shown in my earlier application above referred to for coupling a doubled conical face clutch head 28 therewith. The head 28 in the construction shown consists of an annular sleeve which is preferably composed of a suitable asbestos material or asbestos paper impregnated with a thermo-setting substance, such for example as Bakelite, which is heat treated at a relatively high temperature to produce a carbonized outer bearing surface or surfaces in accordance with the teachings set forth in my prior application above identified, as well as in another application Serial Number 724,110 filed May 5, 1934.

The clutch head 28 also includes an inner tube or liner 29 of metal which serves as a backing and means for reinforcing the universal mounting of the spindle 24 in connection with the head so as to provide free seating of the head in the tapered bores 19 and 22 of the sleeves 18 and 21 respectively. At one side of the casing and mounted in the top wall 6 and bottom wall 8 thereof in the manner taught in the earlier application Serial Number 726,107, are shafts 30, 31, on which are mounted quill gears 32 and 33 respectively. The gear 33 has a surface 34 meshing with the gear 20; the gear 32 has a surface 35 meshing with the gear 23; and the quill gears have surfaces 32a and 33a which mesh with each other so as to provide a gear train for placing the sleeve 18 in operative engagement with the sleeve 21.

Disposed on the shaft 30 above the quill gear 32 is a bushing 36 having an enlarged portion 37 which is adapted to fit within the recess between the gear surfaces 34, 33a of the quill gear 33 so as to prevent a free flow of lubricating oil therethrough. On the shaft 31 is a combination bushing and baffle 38 which is disposed beneath the quill gear 33 and includes a part 39 seating snugly in the bottom wall 8 of the casing. The bushing has a collar portion 40 which includes an arc-shaped extension 41 at one side thereof which fits around the collar portion of a bushing 42 arranged in the bottom wall 8 of the casing for supporting the lower end of the shaft 30.

The arc-shaped extension 41 serves to properly aline and locate the bushing 38 in the casing to arrange a long baffle wall 43 adjacent and longitudinally of the outer surface of the sleeve 21 and a shorter baffle 44 between the gear surfaces 35 and 32a of the quill gear 32. The gear surface 35 operated in a recess portion 45 arranged immediately below the baffle wall 44. The upper end of the bushing 38 has an outwardly extending flange 46 upon which the quill gear 33 seats.

In order to facilitate more accurate control of the lubricating oil, the outer surface of the sleeve 21 is made continuous with the outer edges of the teeth of the gear 23 and said gear teeth are cut long in said body.

Upon a consideration of Fig. 3 of the drawing, it will be seen that the space between the quill gears 32, 33 and bushings 36, 38 is substantially closed, it being understood that slight clearance is provided for free action of the parts one with respect to the other as well as to provide a slight flow of lubricating oil between these surfaces. The several gears will also have holes drilled through the surfaces thereof to provide for the feeding of oil into the bushings or bearings therefor.

In the use of my improved attachment, lubricating oil will be supplied to the bottom or reservoir end 47 of the casing through a suitable admission plug 48 in the top wall 6 to maintain a level of oil substantially at the central portion of the sight opening 12 or to submerge the gears 23 and 35 therein. In the operation of the attachment, the sleeve 21 is travelling in the direction of the arrow x, Fig. 2; and the oil drawn in by the whirling action created by the rotation of the gear 23 as well as gear 35 will cause the oil to be thrown against the baffle wall 43, causing the same to rise vertically in the casing. The baffle wall 44 and the enlargement or baffle 37 of the bushing 36 serve to prevent the escape of oil into and between the quill gears and their respective bushings, at least to any major degree, thus permitting this oil to travel upwardly into the bearing 15 and to lubricate the gears 20, 34 as well as the gear surfaces 32a, 33a and the bearings within the quill gears. At the same time, the lubricating oil will pass onto the clutch head 28 and pass through the gears provided on the conical or bearing surfaces of the head to lubricate said head as well as the spindle 24 and the bearing 26 including the universal joint 24a at the upper end of the spindle.

The action of the gears 20, 34 at the top of the casing which is opposite to that of the whirling action of the gears in the bottom of the casing will serve in a manner to check or retard to a slight degree the upward travel of the lubricating oil and avoid any tendency of flooding oil out through the top of the casing around the spindle 16. In fact, the pumping or fountain action of the lubricating oil may be controlled and regulated to a large degree by the amount of clearance provided between the baffles 43, 44, 37 and their adjacent parts as well as to the particular structure or contour of said parts. These structural features may be varied or modified to suit different kinds of devices or apparatus in connection with which the same are employed as well as to be consistent with the size of the device and the speed of its operation.

My invention relates primarily to devices of the kind under consideration which are operated at high speeds, and by using a friction clutch of the kind described, I have found that the entire device may be operated efficiently in an oil bath or with free lubrication supply to produce efficient and accurate operations of tapping or the like at high speeds and under the required loads. I have also found in practice that the clutch heads may be in the form of continuous sleeves or tubular bodies supported rigidly by solid tubes freely coupled with the spindles to accurately sit in the forward and reverse drive clutch sleeves.

The accompanying drawing is illustrative of one method of carrying my invention into effect which is consistent with the objects and results to be accomplished, and it will appear that with other types or designs of tapping attachments, the several baffle elements will be constructed to be consistent with the changes in contour as well as the assemblage and arrangement of parts.

Having fully described my invention, what I claim as new and desire to secure by Letters Patent, is:

1. In a device of the class described, a casing, a plurality of members rotatably mounted in said casing and disposed at the upper and lower portions thereof and side by side, an oil reservoir at the lower end portion of the casing and in which a part of said members are submerged and rotatably mounted, and means arranged vertically in the casing in close proximity to and intermediate adjacent surfaces of said rotatable members for transmitting the lubricating oil from said reservoir vertically in the casing to lubricate the upper rotatable members in said casing.

2. In a device of the class described, a casing, a plurality of members rotatably mounted in said casing and disposed at the upper and lower portions thereof and side by side, an oil reservoir at the lower end portion of the casing and in which a part of said members are submerged and rotatably mounted, and means arranged vertically in the casing in close proximity to said rotatable members for transmitting the lubricating oil from said reservoir vertically in the casing to lubricate the upper rotatable members in said casing, said means including a fixed baffle having a vertical baffle wall arranged intermediate adjacent surfaces of said members and in close proximity to the peripheral edge of one of the rotatable members disposed in the bottom of said casing.

3. In a device of the class described, a casing, a plurality of members rotatably mounted in said casing and disposed at the upper and lower portions thereof, an oil reservoir at the lower end portion of the casing and in which a part of said members are submerged and rotatably mounted, means arranged vertically in the casing in close proximity to said rotatable members for transmitting the lubricating oil from said reservoir vertically in the casing to lubricate the upper rotatable members in said casing, said means including a fixed baffle having a vertical baffle wall arranged in close proximity to the peripheral edge of one of the rotatable members disposed in the bottom of said casing, said rotatable members including forward and reverse drive clutch sleeves, a clutch head disposed within and adapted to frictionally engage the respective clutch sleeves, and means whereby lubricating oil may be transmitted between the surfaces of said head and clutch sleeves.

4. A tapping attachment of the class described, comprising a casing, a forward drive clutch sleeve in the upper end of the casing, a reverse drive clutch sleeve in the lower portion thereof, a clutch head disposed between and adapted to move alternately into engagement with both of said clutch sleeves, a gear train in said casing at one side of said clutch sleeves for placing the same in operative engagement with each other, means forming an oil reservoir in the lower portion of the casing and in which the lower clutch sleeve is partially submerged, and means between the gears of said gear train and said clutch sleeves for providing a substantially continuous baffle vertically in said casing whereby in the rotation of said clutch sleeves and gear train, lubricating oil from said reservoir is fed vertically in the casing to lubricate all of the operative parts in said casing.

5. A tapping attachment of the class described, comprising a casing, a forward drive clutch sleeve in the upper end of the casing, a reverse drive clutch sleeve in the lower portion thereof, a clutch head disposed between and adapted to move alternately into engagement with said clutch sleeves, a gear train in said casing at one side of said clutch sleeves for placing the same in operative engagement with each other, means forming an oil reservoir in the lower portion of the casing and in which the lower clutch sleeve is partially submerged, means between the gears of said gear train and said clutch sleeves for providing a substantially continuous baffle vertically in said casing whereby in the rotation of said clutch sleeves and gear train, lubricating oil from said reservoir is fed vertically in the casing to lubricate all of the operative parts in said casing, and said baffle being partially formed by a bushing arranged adjacent the gears of said gear train and including a vertical baffle wall arranged in close proximity to the periphery of said lower reverse drive clutch sleeve.

6. A tapping attachment of the class described, comprising a casing, a forward drive clutch sleeve in the upper end of the casing, a reverse drive clutch sleeve in the lower portion thereof, a clutch head disposed between and adapted to move alternately into engagement with said clutch sleeves, a gear train in said casing at one side of said clutch sleeves for placing the same in operative engagement with each other, means forming an oil reservoir in the lower portion of the casing and in which the lower clutch sleeve is partially submerged, means between the gears of said gear train and said clutch sleeves for providing a substantially continuous baffle vertically in said casing whereby in the rotation of said clutch sleeves and gear train, lubricating oil from said reservoir is fed vertically in the casing to lubricate all of the operative parts in said casing, said baffle being partially formed by a bushing arranged adjacent the gears of said gear train and including a vertical baffle wall arranged in close proximity to the periphery of said lower reverse drive clutch sleeve, and another baffle wall on said bushing substantially at right angles to the first named wall and disposed intermediate predetermined gears of said gear train.

7. A tapping attachment of the class described, comprising a casing, a forward drive clutch sleeve in the upper end of the casing, a reverse drive clutch sleeve in the lower portion thereof, a clutch head disposed between and adapted to move alternately into engagement with said clutch sleeves, a gear train in said casing at one side of said clutch sleeves for placing the same in operative engagement with each other, means forming an oil reservoir in the lower portion of the casing and in which the lower clutch sleeve is partially submerged, means between the gears of said gear train and said clutch sleeves for providing a substantially continuous baffle vertically in said casing whereby in the rotation of said clutch sleeves and gear train, lubricating oil from said reservoir is fed vertically in the casing to lubricate all of the operative parts in said casing, said baffle being partially formed by a bushing arranged adjacent the gears of the gear train and including a vertical baffle wall arranged in close proximity to the periphery of said lower reverse drive clutch sleeve, another baffle wall on said bushing substantially at right angles to the first named wall and disposed intermediate predetermined gears of said gear train, and another bushing at the upper end portion of the gear train having a baffle portion arranged intermediate predetermined gears of said gear train.

8. A tapping attachment of the class described comprising a casing, a forward drive clutch sleeve in the upper end of the casing, a reverse drive clutch sleeve in the lower portion thereof, a clutch head disposed between and adapted to move alternately into engagement with said clutch sleeves, a gear train in said casing at one side of said clutch sleeves for placing the same in operative engagement with each other, means forming an oil reservoir in the lower portion of the casing and in which the lower clutch sleeve is partially submerged, and means in said casing arranged in close proximity to said clutch sleeves and gear train for forming a vertical baffle in the casing causing lubricating oil to be fed vertically to lubricate all the parts within the casing in the operation of the device.

9. A tapping attachment of the class described comprising a casing, a forward drive clutch sleeve in the upper end of the casing, a reverse drive clutch sleeve in the lower portion thereof, a clutch head disposed between and adapted to move alternately into engagement with said clutch sleeves, a gear train in said casing at one side of said clutch sleeves for placing the same in operative engagement with each other, means forming an oil reservoir in the lower portion of the casing and in which the lower clutch sleeve is partially submerged, means in said casing arranged in close proximity to said clutch sleeves and gear train for forming a vertical baffle in the casing causing lubricating oil to be fed vertically to lubricate all the parts within the casing in the operation of the device, and said last named means comprising a bushing seating in the bottom wall of the casing and including vertically disposed baffle walls arranged at different circumferential points on said bushing.

10. The combination with a tapping attachment of the class described employing forward and reverse drive clutch sleeves, an annular friction clutch head disposed between said sleeves, and means in the casing for placing said sleeves in operative engagement with each other, of means for lubricating the several operative parts of the attachment, said means comprising an oil reservoir formed in the lower portion of the casing in which a number of the parts are submerged and operated to whirl or agitate the oil in said reservoir, and means exposed to the whirled or agitated oil and extending upwardly in the casing from said reservoir to the top of the casing for transmitting the lubricating oil vertically therein in a substantially column-like fashion to provide lubrication for all of the operating parts of the attachment.

11. The combination with a tapping attachment of the class described employing forward and reverse drive clutch sleeves, an annular friction clutch head disposed between said sleeves and means in the casing for placing said sleeves in operative engagement with each other, of means for lubricating the several operative parts of the attachment, said means comprising an oil reservoir formed in the lower portion of the casing in which a number of the parts are submerged and operated to whirl or agitate the oil in said reservoir, and means exposed to the whirled or agitated oil and extending upwardly in the casing from said reservoir to the top of the casing for transmitting the lubricating oil vertically therein in a substantially column-like fashion to provide lubrication for all of the operating parts of the attachment, said last named means comprising a plurality of baffle elements disposed vertically in the casing in association with rotatable members disposed therein to form a substantially vertical baffle wall.

12. In tapping attachments of the class described, a baffle element comprising an elongated bushing, the periphery of which is provided with one long baffle wall and a shorter baffle wall spaced circumferentially with respect to the first named wall.

13. In tapping attachments of the class described, a baffle element comprising an elongated bushing, the periphery of which is provided with one long baffle wall and a shorter baffle wall spaced circumferentially with respect to the first named wall, and means on said bushing for definitely keying or locking the same in its support.

14. A tapping attachment comprising a casing, a forward drive clutch sleeve rotatably mounted in the upper end of the casing, a drive spindle coupled therewith for actuating said sleeve, a reverse drive clutch sleeve rotatably mounted in the lower portion of the casing in axial alinement with the first named sleeve, a clutch head mounted within said sleeves and movable into engagement therewith, a driven spindle freely coupled with said head and projecting through the lower end of the casing, two shafts mounted at one side of the casing, quill gears on said shafts meshing with each other and one with the first named sleeve and the other with the second named sleeve to place said sleeves in operative engagement with each other, bushings on said shafts at the end of said quill gears, means including a bushing on which the driven spindle is mounted for forming an oil reservoir in the lower portion of said casing and in which the second named clutch sleeve and one of said quill gears is partially submerged, and the bushings on said shafts including baffle portions extending in the direction of adjacent quill gears for forming a substantially continuous vertical baffle wall between said gears to guide lubricating oil vertically in said casing to lubricate all of the rotatable parts therein.

15. A tapping attachment comprising a casing, a forward drive clutch sleeve rotatably mounted in the upper end of the casing, a drive spindle coupled therewith for actuating said sleeve, a reverse drive clutch sleeve rotatably mounted in the lower portion of the casing in axial alinement with the first named sleeve, a clutch head mounted within said sleeves and movable into engagement therewith, a driven spindle freely coupled with said head and projecting through the lower end of the casing, two shafts mounted at one side of the casing, quill gears on said shafts meshing with each other and one with the first named sleeve and the other with the second named sleeve to place said sleeves in operative engagement with each other, bushings on said shafts at the ends of said quill gears, means including a bushing on which the driven spindle is mounted for forming an oil reservoir in the lower portion of said casing and in which the second named clutch sleeve and one of said quill gears is partially submerged, and the bushings on said shafts including baffle portions extending in the direction of adjacent quill gears for forming a substantially continuous vertical baffle wall between said gears to guide lubricating oil vertically in said casing to lubricate all of the rotatable parts therein, and one of said bushings including another baffle wall extending in the direction of the reverse drive clutch sleeve and disposed in close proximity thereto for directing the oil upwardly in a vertical column along said vertical baffle wall.

16. A tapping attachment comprising a casing, a forward drive clutch sleeve rotatably mounted in the upper end of the casing, a drive spindle coupled therewith for actuating said sleeve, a reverse drive clutch sleeve rotatably mounted in the lower portion of the casing in axial alinement with the first named sleeve, a clutch head mounted within said sleeves and movable into engagement therewith, a driven spindle freely coupled with said head and projecting through the lower end of the casing, two shafts mounted at one side of the casing, quill gears on said shafts meshing with each other and one with the first named sleeve and the other with the second named sleeve to place said sleeves in operative engagement with each other, bushings on said shafts at the ends of said quill gears, means including a bushing on which the driven spindle is mounted for forming an oil reservoir in the lower portion of said casing and in which the second named clutch sleeve and one of said quill gears is partially submerged, and the bushings on said shafts including baffle portions extending in the direction of adjacent quill gears for forming a substantially continuous vertical baffle wall between said gears to guide lubricating oil vertically in said casing to lubricate all of the rotatable parts therein, one of said bushings including another baffle wall extending in the direction of the reverse drive clutch sleeve and disposed in close proximity thereto for directing the oil upwardly in a vertical column along said vertical baffle wall, and means on said last named bushing for alining the same in said casing.

GEORGE W. EMRICK.